Figure 1:
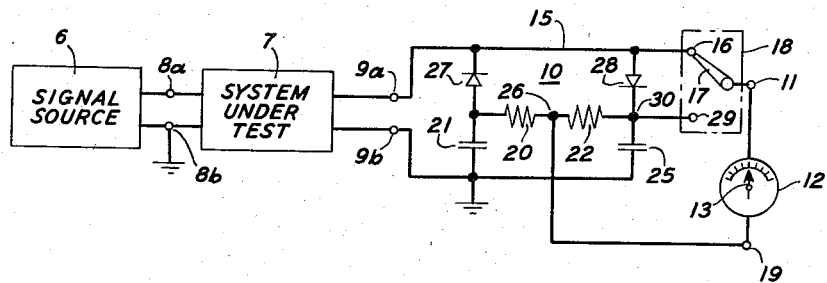

Dec. 22, 1959   W. R. YOUNG, JR   2,918,623
TIME BIAS DETECTOR
Filed Dec. 6, 1957

INVENTOR
W. R. YOUNG, JR.
BY *Charles Scott Phelan*

ATTORNEY

United States Patent Office 2,918,623
Patented Dec. 22, 1959

2,918,623

TIME BIAS DETECTOR

William R. Young, Jr., Summit, N.J., assignor to Bell Telephone Laboratories, Incorporated, New York, N.Y., a corporation of New York Application December 6, 1957, Serial No. 701,223

7 Claims. (Cl. 324—57)

This invention relates to an electric time bias measuring circuit for indicating dissymmetry, in point of time, between the positive-going and negative-going portions of a varying potential wave. The word "varying" is employed to include an alternating wave having positive-going and negative-going portions which are also positive and negative, respectively, with respect to ground and to include a varying direct potential wave having positive-going and negative-going portions which are all of the same polarity with respect to ground.

In high-speed data transmission systems, information is transmitted in a pulse code comprising mark and space signals which may, for example, be the positive-going and negative-going portions, respectively, of a rectangular voltage wave. Each mark and each space is termed a "bit" of information and each mark-space combination is called a "dot." Signal transmission over such a transmission system may be evaluated by applying a test signal, which comprises a series of dots of a predetermined condition of time symmetry, to the sending end of the system and measuring at the receiving end of the system the dissymmetry, or time bias, which may have been injected into the test signal during transmission.

Prior art apparatus which has been employed for measuring dissymmetry is generally designed for ordinary telegraph signal transmission systems which operate at relatively low frequencies. Such apparatus includes moving mechanical members and, therefore, is only suitable for tests in which the bit rate may be of the order of 75 bits per second. The prior art apparatus is completely unsuitable for testing systems in which the normal bit rate may be of the order of 1000 bits per second, or higher, because of the inertia of the moving mechanical members.

This invention contemplates a time bias detector circuit which employs primarily electric circuit elements. The only moving mechanical member is an electric meter movement for indicating the polarity, and amount, of bias in high-speed alternating waves comprising dot signals. The expression "polarity of bias," as well as the synonymous expression "polarity of dissymmetry," is employed herein with reference to the indication of which bit, the mark or the space, in each dot is longer than the other bit.

Accordingly, it is one object of the invention to indicate the polarity and magnitude of dissymmetry in point of time between successive positive-going and negative-going portions of a varying potential wave.

Another object is to measure time symmetry of dot signals occurring at high repetition rates.

A further object is to evaluate transmission over a high-speed data transmission system by detecting dissymmetry in a varying voltage wave transmitted therethrough.

A further object is to provide a time bias measuring circuit for use in connection with varying voltage waves transmitted over a high-speed data transmission system and having frequencies in the kilocycles-per-second range.

The above objectives of the invention are accomplished in an illustrative embodiment thereof in which an alternating potential wave is generated and applied, with zero time bias, to the sending end of a high-speed data transmission system under test. At the receiving end of the transmission system, the wave is applied to a time bias detector circuit in which a direct current potential, which is a function of the potential with respect to ground of a predetermined intermediate potential level between the peak amplitudes of the alternating potential wave, is applied in series with the alternating potential wave between the terminals of an average-reading, electric meter. The meter indicates the average value of the difference between the direct potential and the alternating potential, which difference is a function of dissymmetry in the received wave.

The alternating potential wave is provided by a generator of dot signals. The output of the dot generator is applied to the sending end of the system. One terminal at the receiving end of the system is connected directly to one meter terminal. The direct current potential is provided by a resistance-capacitance network connected to a second terminal at the receiving end of the system and to a second meter terminal. The resistance-capacitance network comprises a first capacitor and a first resistor connected in series between the second system terminal and the second meter terminal, and a second capacitor and a second resistor also connected in series between the second system and meter terminals and in parallel with the first-mentioned resistor-capacitor series connection. The second meter terminal is common to both resistors, and the second system terminal is common to both capacitors and ground.

A first diode is connected between the one system terminal and a terminal which is common to the first resistor and the first capacitor, and a second diode is connected between the one system terminal and a terminal which is common to the second resistor and second capacitor. The diodes are poled for conduction in opposite directions with respect to the one system terminal for applying to the respective capacitors the peak positive and negative potentials of the alternating potential wave.

The total potential across the two capacitors is thus the peak-to-peak potential difference of the alternating voltage wave; and, if the two resistors are of equal resistance, the second meter terminal is held at a direct current reference voltage which is equal to the peak voltage with respect to ground of the negative-going wave portion plus one half of the peak-to-peak potential difference of the alternating voltage wave. The meter thus indicates the average value of the alternating voltage wave with respect to the above-noted direct current reference potential. In other words, the meter indicates the difference between the average value with respect to ground of the alternating voltage wave and the above-noted direct current reference potential. The average value of the alternating voltage, assuming constant peak amplitudes, is equal to the direct reference potential for an alternating wave that is symmetrical in point of time. Likewise, the average value of the alternating voltage is greater than the reference voltage when the positive-going portion of the wave is of greater duration than the negative-going portion; and the average value of the alternating voltage is less than the reference voltage when the negative-going portion of the wave is of greater duration than the positive-going portion.

It is one feature of the invention that the time bias circuit does not include moving parts which inhibit its actions in the kilocycles-per-second range of frequencies.

It is another feature that if there is applied to the time bias detector of the invention a varying voltage wave which would not cause a time bias indication on the detector meter, under constant peak amplitude conditions, then peak amplitude variations in the wave will not affect the indication.

Figure 2:
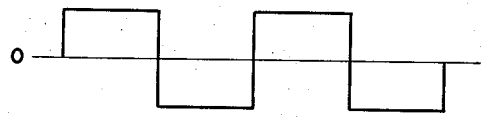
Figure 3:
Figure 4:
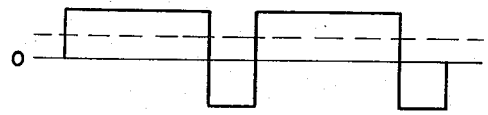

A better understanding of the arrangement and operation of the invention may be derived from a consideration of the following specification in accordance with the drawing in which:

Fig. 1 is a diagram partly in block and line form and partly in schematic form of a testing system embodying a specific form of the invention; and Figs. 2, 3, and 4 are diagrams of voltage waves illustrating the operation of the invention in Fig. 1.

Referring to Fig. 1, a signal source 6 supplies dot signals to a transmission system 7 which is under test via terminals 8a and 8b. Terminal 8b is connected to ground. Source 6 may comprise, for example, a square wave generator and a constant output impedance coupling circuit such as those described in the copending application of J. M. Wier entitled "Constant Output Impedance Network" which is assigned to the same assignee as the present application and which is being filed on even date herewith. The system 7 may be a high-speed data transmission system. The dot signals at the receiving end of system 7 are applied to input terminals 9a, 9b of a time bias detector circuit 10.

In accordance with the invention, terminal 9a is connected to one terminal 11 of an indicating device such as a meter 12 via a direct metallic connection comprising a lead 15, and a contact 16 and an armature 17 of a single-pole double-throw switch 18. Meter 12 may be a conventional direct current voltmeter which is responsive to the average value of an alternating potential applied thereto. Meter 12 may be calibrated to indicate percent dissymmetry, and it may be adjusted for zero deflection with the indicating pointer 13 thereof at the center of the meter scale. Percent dissymmetry may be expressed as the duration of a marking bit in an unsymmetrical wave, minus the average duration of a bit, taking both marking and spacing bits into account, all divided by said average durations.

Input terminal 9b is connected to ground and to a second terminal 19 of meter 12 via a resistance-capacitance network that will be subsequently described. The resistance-capacitance network is used for storing the peak potentials of the positive-going and negative-going portions of the alternating potential wave and comprises a resistor 20 and a capacitor 21 connected in series between terminals 19 and 9b in the order named, and a resistor 22 and a capacitor 25 connected in series between terminals 19 and 9b in the order named. The two resistance-capacitance series circuits are also obviously in parallel with each other between terminals 19 and 9b. The grounded input terminal 9b is common to capacitors 21 and 25 while the terminal 26 which is common to resistors 20 and 22 is connected to meter terminal 19.

Dot signals from the terminals 9a and 9b are applied to capacitors 21 and 25 via a circuit which does not include meter 12 and which comprises a diode 27 connected in series with capacitor 21 between terminals 9a and 9b, and a diode 28 connected in series with capacitor 25 between terminals 9a and 9b. Diode 27 is poled for conduction toward terminal 9a, and diode 28 is poled for conduction away from terminal 9a. Diodes 27 and 28 and capacitors 21 and 25 are thus connected in a bridge circuit. One diagonal of the bridge circuit has one terminal thereof common to diodes 27 and 28 connected to terminal 9a and has the other terminal thereof common to capacitors 21 and 25 connected to grounded terminal 9b. The two resistors 20 and 22 are connected in series across the other diagonal of the bridge.

Resistors 20 and 22 have equal values of resistances, but such equality is not necessary to the operation of the invention. If the resistors have unequal resistances, meter 12 would indicate a zero reading for a predetermined amount of dissymmetry, as will be evident from the operation of the invention as hereinafter discussed.

Armature 17 is selectably operable for engaging either contact 16 or contact 29. Contact 29 is connected to a terminal 30 which is common to diode 28, resistor 22, and capacitor 25 for calibrating meter 12, as will be hereinafter described.

The operation of the invention may be readily understood when considered in connection with the voltage wave diagrams of Figs. 2, 3, and 4. A square wave such as the one illustrated in Fig. 2 is applied to the input of data transmission system 7 under test. The wave of Fig. 2 is symmetrical in point of time, and it is also symmetrical in point of amplitudes with respect to the zero voltage axis illustrated.

Assuming first that the square wave applied to the sending end of system 7 is received undistorted, thereby indicating satisfactory operation of system 7, the wave of Fig. 2 is also applied to input terminals 9a and 9b of bias detector 10. The positive, or mark, portions of the wave bias diode 28 ON and bias diode 27 OFF. Capacitor 25 is charged to the peak potential of the mark portion of the signal. The subsequent negative, or space, portion of the waves biases diode 27 ON and biases diode 28 OFF thereby charging capacitor 21 to the peak potential of the space portion of the wave. The time constant of either capacitor 21 or 25 together with both resistor 20 and resistor 22 is made large with respect to the period of the wave of Fig. 2 so that neither capacitor can discharge significantly during one half cycle through the resistors 20 and 22 and the system 7. Capacitors 21 and 25 are charged with opposite polarities with respect to their common ground terminal; and, therefore, the total peak-to-peak potential difference of the wave of Fig. 2 is stored in the series combination of capacitors 21 and 25 and is impressed on the series combination of resistors 20 and 22.

Terminal 26 is at a potential with respect to ground of an intermediate potential level between the peak potentials of the positive-going and negative-going peaks of the wave of Fig. 2. When resistors 20 and 22 have equal resistances the intermediate potential level is midway between the positive-going and negative-going peaks and is designated the mid-peak potential. The mid-peak potential with respect to ground for any wave may be determined by finding the value of one half of the peak-to-peak potential difference of the wave and adding thereto the potential with respect to ground of the negative-going peak. The mid-peak potential may also be obtained by subtracting from the potential with respect to ground of the positive-going peak one half of the peak-to-peak potential difference. The polarity signs of the peak voltages must always be taken into account.

The reference potential at terminal 26 is a substantially constant direct potential and is applied to meter terminal 19. The instantaneous signal voltage variations are applied to meter terminal 11, and meter 12 responds to the average value of the signal voltage variations with respect to the reference potential. In the case of the voltage wave illustrated in Fig. 2, which is characterized by amplitude symmetry, the sum of one half of the peak-to-peak potential and the negative peak potential with respect to ground is zero. Therefore meter 12 responds to the average value of the waveform of Fig. 2 with respect to a zero voltage reference. Since the wave of Fig. 2 has positive-going and negative-going portions of equal duration and amplitude, the average value of the wave is also zero and there will be no deflection in meter 12, thus indicating a symmetrical wave in point of time.

If it is assumed that the waveform of Fig. 2 is displaced to produce amplitude dissymmetry without affecting the time symmetry, the average value of the wave is changed. The peak amplitude of each half cycle is also changed with one becoming smaller and the other becoming larger. The charges on capacitors 21 and 25 are changed in a similar manner, but the net peak-to-peak potential difference remains the same, and the total potential difference across resistors 20 and 22 also remains the same. However, the potential with respect to ground of terminal 26 changes in the same direction, and in the same amount, as the average value of the wave. Therefore, the new wave with amplitude dissymmetry tends to have the same effect on the meter indication, namely, zero deflection as previously described in connection with the wave of symmetrical amplitude and time. For example, if the peak-to-peak potential difference is 10 volts and the wave of Fig. 2 is displaced positively one volt, the peak potential of the mark portions of the wave is 6 volts and the peak potential of the space portions of the wave is 4 volts. Capacitor 25 charges to 6 volts and capacitor 21 charges to 4 volts. The total potential across resistors 20 and 22 however is still 10 volts with 5 volts potential difference appearing across each resistor. Adding the potential differences across individual resistors and their corresponding capacitors it is seen that the potential with respect to ground of terminal 26 is now +1 volt. However, since the average value of the wave is also +1 volt there is no indication of time dissymmetry on meter 12.

Referring to Fig. 3 there is illustrated a rectangular voltage wave characterized by approximately 50 percent time dissymmetry with the negative-going space portions of the wave being longer than the positive-going mark portions thereof. When a voltage wave such as the wave of Fig. 3 is received at terminals 9a and 9b, with the wave of Fig. 2 being applied to terminals 8a and 8b, improper transmission through system 7 is indicated. Since the peak potentials of the wave of Fig. 3 are the same as those in Fig. 2 the charges on capacitors 21 and 25 are not affected by the change in time symmetry and meter 12 indicates the average value of the wave of Fig. 3 with respect to a reference of zero volts. The spaces are longer than the marks, and the average value of the wave is a negative potential indicated by the horizontal broken line in Fig. 3. The negative potential difference between the zero reference potential on terminal 19 and the alternating potential with a negative average value on terminal 11 causes a deflection of the pointer 13 to the left thereby indicating a certain percent of time bias. The direction of deflection indicates the polarity of the bias, i.e., the space bits are longer than the mark bits, and may be used as a guide in adjusting system 7 to restore the time symmetry of Fig. 2.

Referring to Fig. 4, there is illustrated a dot test signal having the positive mark portions thereof of longer duration than the negative space portions thereof. When the voltage wave of Fig. 4 is received at terminals 9a and 9b, with the wave of Fig. 2 being applied to terminals 8a and 8b, improper transmission through system 7 is indicated. The peak amplitudes are the same as those in Figs. 2 and 3 so the peak-to-peak voltage is the same as in Figs. 2 and 3, terminal 19 is at zero volts with respect to ground, and the alternating wave applied to terminal 11 has a positive average value as indicated by the horizontal broken line in Fig. 4. Accordingly, the pointer 13 is deflected to the right thus indicating a dissymmetry condition in which the mark bits are of longer duration than the space bits. The direction and magnitude of deflection of pointer 13 are used as guides in adjusting system 7 to restore the time symmetry of Fig. 2.

In either of the time dissymmetry examples described above in relation to Figs. 3 and 4, the effect of an amplitude dissymmetry condition occurring simultaneously with the time dissymmetry condition would tend to be suppressed in the manner described above in connection with an assumed amplitude dissymmetry in the wave of Fig. 2.

In summary, if the voltage wave of Fig. 2 is shifted vertically with respect to the zero voltage axis, the average value of the wave is changed; but the reference, or mid-peak, potential is also changed an equal amount in the same direction; and the indication on meter 12 is unchanged. If the amplitude of one peak is changed while holding the other peak amplitude constant, both the average and mid-peak potentials of the wave are changed in the same direction and by amounts which are equal to one another. However, a change in the relative durations of the positive-going and negative-going portions of the wave shifts the average value of the wave, but the change has no effect on the mid-peak reference potential. Accordingly, the meter 12 indicates changes in wave symmetry in point of time and is substantially non responsive to changes in wave amplitude.

If resistors 20 and 22 have unequal resistance, instead of equal resistances as in the previously described examples, the direct current reference potential for terminal 19, which is established at terminal 26 as a function of the peak-to-peak potential of the applied wave, would be some value other than the sum of one half of the peak-to-peak potential difference plus the negative peak potential. The reference potential for terminal 19 of meter 12 would be established at some potential other than zero, and a zero indication on meter 12 would correspond to a predetermined magnitude and polarity of dissymmetry which are functions of the relative magnitudes of resistors 20 and 22.

Meter 12 may be calibrated at the 100 percent dissymmetry point on its scale by operating armature 17 of switch 18 to contact 29. This connects meter 12 across resistor 22; and, in the case of equal resistances for resistors 20 and 22, one half of the peak-to-peak potential difference of the input wave is impressed continuously upon meter 12. This potential difference corresponds to 100 percent dissymmetry, i.e., the average bit length in a dot is 1 unit of time and actual marking bit length is 2 units of time.

Although this invention has been described in connection with a particular embodiment thereof, it is understood that other embodiments thereof which will be obvious to those skilled in the art are included within the spirit and scope of the invention.

What is claimed is:

1. A time bias detector for indicating the bias in varying potential signals transmitted on a high-speed data transmission system, said detector comprising a pair of input terminals for receiving said signals from said system, a ground connection to one of said input terminals, means connected to said input terminals for deriving from the received signals a voltage having a magnitude which is a function of the potential with respect to ground of a predetermined intermediate potential level between the positive-going and negative-going peaks of said received signals, said means comprising a first diode and a first capacitor connected in series, a second diode and a second capacitor connected in series, said diodes being poled in opposite directions, said diodes and capacitors being arranged in a bridge having one diagonal in which one terminal common to said diodes is connected to another one of said input terminals and a second terminal common to said capacitors is connected to said one input terminal, and two equal resistors connected in series across the other diagonal of said bridge, and a meter connected between said one terminal of the one diagonal and a midpoint of said series resistors.

2. In a testing system, a bias detector in accordance with claim 1, a source of varying potential signal which has a substantially symmetrical configuration in point of time, a transmission system to be tested, means for applying said symmetrical varying signal to the input of said system, said system providing at its output a test output comprising said varying potential signal having an amount of time dissymmetry which is a function of the transmission characteristic of said system for said signal, and means for applying said test output to said bias detector to measure said amount of time dissymmetry.

3. An electric circuit for measuring dissymmetry between the durations of positive-going and negative-going portions of a varying potential wave as a function of the difference between the average value of the instantaneous amplitudes of said wave and the average value with respect to ground of the potential of a predetermined intermediate level between the peak amplitudes of said positive-going and negative-going portions, said circuit comprising a meter having first and second terminals, a pair of input terminals for receiving said varying potential wave, means for coupling the instantaneous variations of said varying potential wave to said first meter terminal comprising a first direct metallic connection between said first meter terminal and one of said input terminals, a resistance-capacitance circuit comprising two capacitors each having one terminal thereof connected to a common terminal for storing voltage charges representing respectively the peak voltage values of said positive-going and negative-going wave portions, and resistance means connected between the other terminals of said pair of capacitors, a connection from said common terminal to another of said input terminals, rectifier means for coupling said positive-going and negative-going wave portions from said one input terminal to different ones of said pair of capacitors, and means for coupling the potential variations with respect to ground of said intermediate level to said second terminal of said meter, the last-mentioned means comprising a second direct metallic connection between the last-mentioned second terminal and a preselected point on said resistance means.

4. The electric circuit in accordance with claim 3 in which said intermediate level is midway between said peak amplitudes, the mid-peak potential level, and said resistance means comprises two equal resistors connected in series between the other terminals of said pair of capacitors for deriving from said capacitors the potential with respect to ground of said mid-peak potential level substantially independently of the relative amplitudes of said positive-going portions with respect to said negative-going portions, and said second direct metallic connection is between said second terminal of said meter and a terminal which is common to said two equal resistors.

5. The electric circuit in accordance with claim 3 in which said first direct metallic connection to said first terminal of said meter comprises a switching device for selectably connecting said first meter terminal to said one input terminal for measuring dissymmetry in said varying potential wave or to a terminal common to one of said capacitors and its corresponding rectifier means for calibrating said meter.

6. The electric circuit in accordance with claim 3 in which said intermediate level is midway between said peak amplitudes, the mid-peak potential level, and said resistance means comprises two equal resistors connected in series between the other terminals of said pair of capacitors for deriving from said capacitors the direct current potential with respect to ground of said mid-peak potential level substantially independently of the relative magnitudes of said positive-going portions with respect to said negative-going portions, said meter comprises a deflectable member responsive to the average magnitude and the polarity of potentials applied to the terminals of said meter, said second direct metallic connection is between said second terminal of said meter and a terminal which is common to said equal resistors, and said meter being responsive to the difference between the average value of said instantaneous variations and said mid-peak potential level for deflecting said member in one direction when the average value of said instantaneous variations is more positive than said mid-peak potential thereby indicating the amount by which the positive-going portions of said varying wave are of longer duration than said negative-going portions, said meter deflecting said member in the opposite direction when the average value of said instantaneous variations is more negative than said mid-peak potential thereby indicating the amount by which said negative-going portions exceed in duration said positive-going portions.

7. In a testing system, an electric circuit in accordance with claim 6, a source of alternating potential signals of substantially symmetrical, in standpoint of time, configuration, a transmission system to be tested, means for applying said symmetrical alternating wave to said system, said system providing an output comprising said alternating wave having an amount of time dissymmetry which is a function of the transmission characteristics of said system, and means for applying said output to said electric circuit for measuring the magnitude and polarity of said dissymmetry.

References Cited in the file of this patent

UNITED STATES PATENTS

| | | |
|---|---|---|
| 2,571,650 | Atwood | Oct. 16, 1951 |
| 2,603,779 | Ferrill | July 15, 1952 |